(12) United States Patent
Huang et al.

(10) Patent No.: US 9,213,429 B2
(45) Date of Patent: Dec. 15, 2015

(54) TOUCH DISPLAY MODULE AND ASSEMBLY METHOD THEREOF

(71) Applicant: Chunghwa Picture Tubes, LTD., Taoyuan (TW)

(72) Inventors: Shao-Keng Huang, Taoyuan County (TW); Sheng-Hui Chang, Taichung (TW); Yu-Cheng Tung, Kaohsiung (TW); Ming-Tan Hsu, Miaoli County (TW)

(73) Assignee: Chunghwa Picture Tubes, LTD., Taoyuan (TW)

( * ) Notice: Subject to any disclaimer, the term of this patent is extended or adjusted under 35 U.S.C. 154(b) by 555 days.

(21) Appl. No.: 13/682,746

(22) Filed: Nov. 21, 2012

(65) Prior Publication Data

US 2014/0098035 A1    Apr. 10, 2014

(30) Foreign Application Priority Data

Oct. 9, 2012   (TW) .............................. 101137330 A

(51) Int. Cl.
| | |
|---|---|
| *G06F 3/041* | (2006.01) |
| *H01J 9/24* | (2006.01) |
| *G02F 1/13* | (2006.01) |
| *G02F 1/1333* | (2006.01) |

(52) U.S. Cl.
CPC ................. *G06F 3/041* (2013.01); *H01J 9/241* (2013.01); *G02F 1/1303* (2013.01); *G02F 1/13338* (2013.01); *G06F 2203/04103* (2013.01)

(58) Field of Classification Search
CPC ........... G06F 3/041; G06F 2203/04103; H01J 9/241; G02F 1/1303; G02F 1/13338

USPC ............................................. 345/173; 445/24
See application file for complete search history.

(56) References Cited

U.S. PATENT DOCUMENTS

| | | | |
|---|---|---|---|
| 6,487,350 B1 * | 11/2002 | Veligdan et al. .............. 385/120 |
| 2002/0048438 A1 * | 4/2002 | Veligdan ........................ 385/120 |
| 2002/0114147 A1 * | 8/2002 | Harter, Jr. .............. G01D 11/28 362/23.18 |
| 2010/0171900 A1 * | 7/2010 | Lee ....................... G02B 6/0051 349/58 |
| 2012/0081332 A1 * | 4/2012 | Atsuta ..................... G06F 3/044 345/174 |
| 2012/0113369 A1 * | 5/2012 | Kim .......................... G09F 3/10 349/122 |
| 2013/0323521 A1 * | 12/2013 | Xia et al. ....................... 428/523 |

* cited by examiner

*Primary Examiner* — Dwayne Bost
*Assistant Examiner* — Chineyere Wills-Burns
(74) *Attorney, Agent, or Firm* — Jianq Chyun IP Office

(57) ABSTRACT

A touch display module and an assembly method thereof are provided. The touch display module includes a backlight module, a cover plate, a display panel, a touch panel, a first adhesive layer, a second adhesive layer, a third adhesive layer and a fourth adhesive layer. The cover plate and the backlight module are disposed oppositely. The display panel is disposed between the backlight module and the cover plate. The touch panel is disposed between the display panel and the cover plate. The first adhesive layer covers around the backlight module, the display panel and the touch panel and a back portion of the backlight module. The second adhesive layer is disposed between the backlight module and the display panel. The third adhesive layer is disposed between the display panel and the touch panel. The fourth adhesive layer is disposed between the touch panel and the cover plate.

14 Claims, 5 Drawing Sheets

TOUCH DISPLAY MODULE AND ASSEMBLY METHOD THEREOF

CROSS-REFERENCE TO RELATED APPLICATION

This application claims the priority benefit of Taiwan application serial no. 101137330, filed on Oct. 9, 2012. The entirety of the above-mentioned patent application is hereby incorporated by reference herein and made a part of this specification.

BACKGROUND OF THE INVENTION

1. Field of the Invention

The invention relates to an electronic module and an assembly method thereof and more particularly, to a touch display module and an assembly method thereof.

2. Description of Related Art

Generally, the touch display module is composed by a touch module and a display module, in which the touch module includes a cover plate, a pressure sensitive adhesive, a touch panel and an anti-splinted film (ASF), and the display module includes a display module, a backlight module, a front bezel and a back cover. The back plate is configured to fix and mount the display panel and the backlight module, and the front bezel is circularly disposed outside of the display panel and the back cover to fix the display panel and the back cover.

Currently, a common assembly method for the touch module of the touch display module is by forming the pressure sensitive adhesive on the cover plate, followed by positioning through an alignment pattern on the touch panel to bond the cover plate with the touch panel. With such assembly method, problems such as poor alignment precision between the cover plate and the touch panel and lower process yield rate due to foreign particles and/or gas bubble generated between the cover plate and the touch panel may easily occur.

Further, a bonding process of the touch module and display module is performed after assembly process of the touch module is completed. Generally, a double sided tape may be attached or an adhesive layer may be formed on the front bezel to bond the touch module and the display module. The alignment precision problem may easily occur in the steps of said assembling and bonding processes, thus it usually requires a rework process to improve deviation caused by poor alignment. However, the rework process may easily create a comprehensive destruction to said members, such that the assembling costs may be increased since integrity of members can not be retained.

In addition, in said display module, displacement of the members needs to be avoided by fixing the display panel and the backlight module through the front bezel and the back cover. However, the front bezel and the back cover may increase a thickness of the display module to further increase overall thickness of the touch display module. As a result, such conventional design does not meet the compact size requirement in the modern electronic products.

SUMMARY OF THE INVENTION

An assembly method of a touch display module having a preferable alignment precision for increasing yield rate in assembling is provided.

The invention provides a touch display panel which has advantages of being miniaturized and lightened.

The invention provides an assembly method of a touch display module, which includes the following steps. A detachable mold is provided. The detachable mold includes a bottom portion and a first opening, a second opening, a third opening and a fourth opening connected to pass each other and exposed outside of the bottom portion. The first opening is adjacent to the bottom portion, the second opening is located between the first opening and the third opening, and the third opening is located between the second opening and the fourth opening. A first adhesive layer is formed on internal walls of the first opening, the second opening and the third opening and the bottom portion. A backlight module is disposed in the first opening, in which the backlight module is fixed on the bottom portion of the detachable mold through the first adhesive layer. A second adhesive layer is formed on the backlight module. A display panel is disposed in the second opening, in which the display panel is fixed on the backlight module through the second adhesive layer. A third adhesive layer is formed on the display panel. A touch panel is disposed in the third opening, in which the touch panel is fixed on the display panel through the third adhesive layer. A fourth adhesive layer is formed on the touch panel. A cover plate is disposed in the fourth opening, in which the cover plate is fixed on the touch panel through the fourth adhesive layer. A mold release process is performed to form a touch display module by separating the detachable mold from the first adhesive layer, in which the first adhesive layer covers around the backlight module, the display panel and the touch panel and a back portion of the backlight module.

According to an embodiment of the invention, a bore diameter of the fourth opening is greater than a bore diameter of the third opening, the bore diameter of the third opening is greater than a bore diameter of the second opening, the bore diameter of the second opening is greater than a bore diameter of the first opening; and the bore diameter of the first opening is equal to or slightly greater than a size of the backlight module, the bore diameter of the second opening is equal to or slightly greater than a size of the display panel, the bore diameter of the third opening is equal to or slightly greater than a size of the touch panel and the bore diameter of the fourth opening is equal to or slightly greater than a size of the cover plate.

According to an embodiment of the invention, a material of the first adhesive layer includes a UV transfer black adhesive.

According to an embodiment of the invention, materials of the second adhesive layer and the third adhesive layer include a liquid optical clear resin (OCR) or an optical clear adhesive (OCA).

According to an embodiment of the invention, a material of the fourth adhesive layer includes a pressure sensitive adhesive, a liquid optical clear resin (OCR) or an optical clear adhesive (OCA).

According to an embodiment of the invention, the method of disposing the backlight module in the first opening includes the following steps. Disposing a reflector and a light guiding plate successively in the first opening, in which the light guiding plate is stacked over the reflector, and the reflector is fixed on the bottom portion of the detachable mold through the first adhesive layer. Disposing a light source at a lateral side of the light guiding plate. Forming an adhesive layer on the light source and the light guiding plate. Disposing an optical film on the adhesive layer, in which the optical film is fixed on the light source and the light guiding plate through the adhesive layer.

According to an embodiment of the invention, the light source is composed by a plurality of light emitting diodes.

According to an embodiment of the invention, the detachable mold further includes a fifth opening connected to pass the third opening. The fifth opening is extended from one side of the third opening to the detachable mold. A flexible printed circuit board is further disposed in the fifth opening after the touch panel is disposed in the third opening and before the fourth adhesive layer is formed on the touch panel, the touch panel and the flexible printed circuit board are electrically connected.

The invention further provides a touch display module using above-said assembly method.

In view of above, the assembly method of the invention may sequentially disposing the backlight module, the display panel, the touch panel and the cover plate using opening design of the detachable module and adhesive layers disposition. In comparison to the prior art, the invention does not required to have the alignment pattern manufactured on the display panel and the touch panel for positioning, such that possibility of the alignment precision problem from happening may be reduce to further increase yield rate in assembling the touch display module. Also, member such as the front bezel, the back cover and the anti-splinted film used in prior art may also be omitted to effectively reduce overall thickness of the touch display module. In short, the touch display module of the invention may have a slimmer and lighter design while having a more preferable yield rate in assembling.

To make the above features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
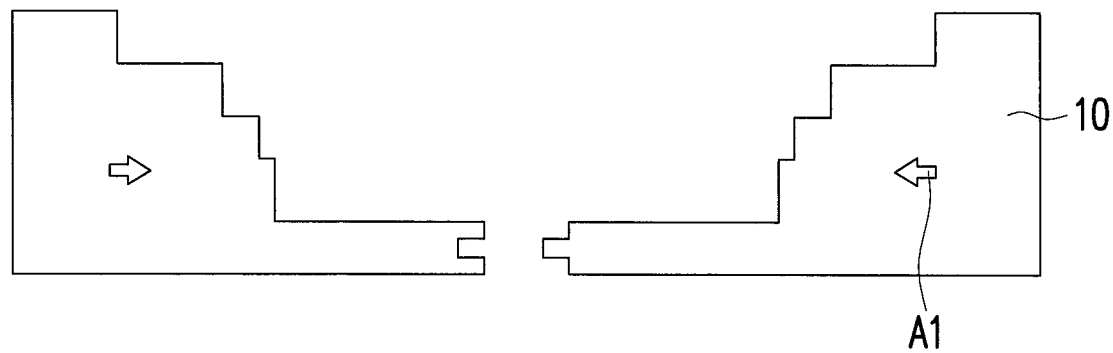
FIGS. 1A to 1M are schematic cross-sectional views illustrating a manufacturing method of a touch display module according to an embodiment of the invention.

FIGS. 1A to 1M are schematic cross-sectional views illustrating a manufacturing method of a touch display module according to an embodiment of the invention. First, referring to FIG. 1A, a detachable mold 10 is provided. In the present embodiment, the detachable mold 10 may be, for example, a mold assembled with a symmetrically arranging method (e.g., to a direction shown by an arrow A1 in FIG. 1A), but the invention is not limited thereto. Hereinafter, the detachable mold 10 of the present embodiment is exemplified using metal as a material thereof. However, in other embodiments, the material of the detachable mold 10 may also be reinforced plastics or other appropriate materials.

Figure 1B:
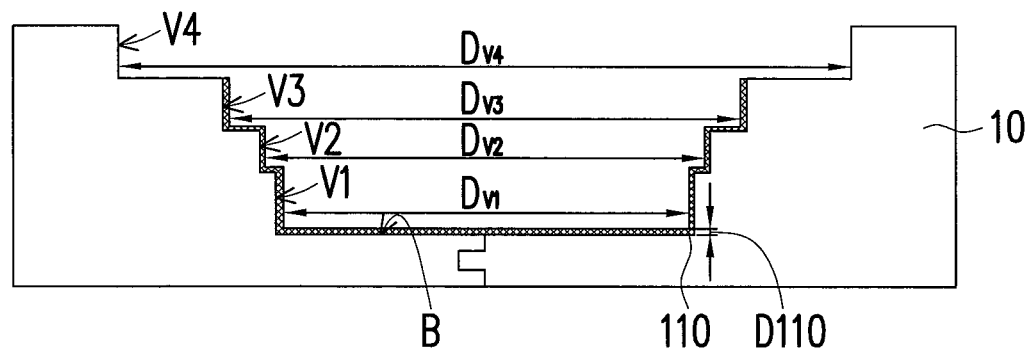
Figure 1C:
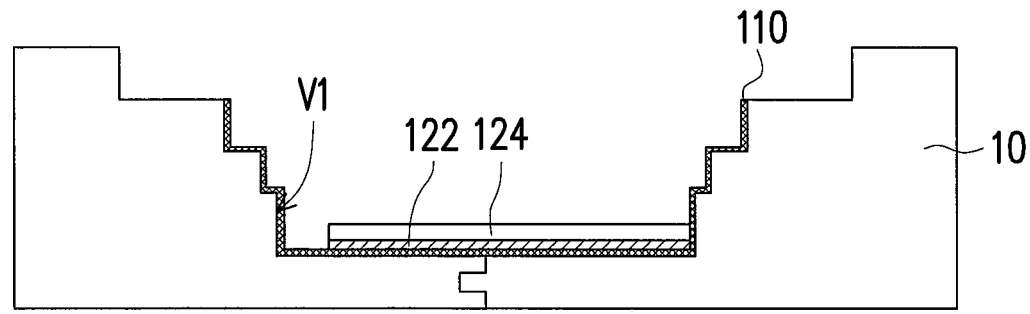

Referring to FIG. 1B, the detachable mold 10 after assembly process includes a bottom portion B and a first opening V1, a second opening V2, a third opening V3 and a fourth opening V4 connected to pass each other and exposed outside of the bottom portion B. More specifically, the first opening V1 is adjacent to the bottom portion B, the second opening V2 is located between the first opening V1 and the third opening V3, and the third opening V3 is located between the second opening V2 and the fourth opening V4, in which a bore diameter $D_{V4}$ of the fourth opening V4 is greater than a bore diameter $D_{V3}$ of the third opening V3, the bore diameter $D_{V3}$ of the third opening V3 is greater than a bore diameter $D_{V2}$ of the second opening V2 and the bore diameter $D_{V2}$ of the second opening V2 is greater than a bore diameter $D_{V1}$ of the first opening V1.

Next, a first adhesive layer 110 is formed on a portion of internal walls of the detachable mold 10. More specifically, the first adhesive layer 110 is formed on internal walls of the first opening V1, the second opening V2 and the third opening V3 and the bottom portion B of the detachable mold 10.

In the present embodiment, a material of the first adhesive layer 110 may be, for example, a UV transfer black adhesive, and a thickness D110 of the first adhesive layer 110 may be, for example, between 30 μm to 50 μm, but the invention is not limited thereto. Generally, the UV transfer black adhesive is adapted for transferring of the plastic and metal molds. In particularly, said UV transfer black adhesive may easily demolded since it has no adhesion to metal mold, but after being exposed to ultraviolet light (i.e., UV light) for curing, a hardness of the curved UV transfer black adhesive may reach up to 3H to 5H.

More specifically, the first adhesive layer 110 of the present embodiment is formed on the portion of the inner walls of the detachable mold 10 and the bottom portion B by, for example, performing a coating process, but the invention is not limited thereto. Said coating process may include the following steps. First, clearing impurities within the inner walls of the detachable mold 10. Next, dropping liquid UV adhesive into the detachable mold 10 so it flatly covers around the bottom portion B, the first opening V1, the second opening V2 and the third opening V3 of the detachable mold 10. Lastly, exposing the UV adhesive to UV light for curing, so as to complete manufacture process of the first adhesive layer 110.

Next, disposing the backlight module 120 in the first opening V1, in which the steps of disposing the backlight module may refer to FIGS. 1C to 1F. First, referring to FIG. 1C, disposing a reflector 122 and a light guiding plate 124 successively in the first opening V1, in which the light guiding plate 124 is stacked over the reflector 122. More specifically, the light guiding plate 124 is covered on the reflector 122, and the reflector 122 is fixed on the bottom portion B of the detachable mold 10 through the first adhesive layer 110.

Figure 1D:
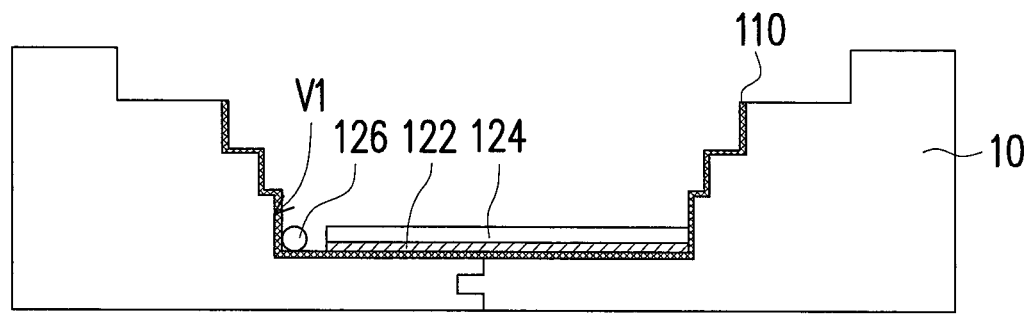

Referring to FIG. 1D, disposing a light source 126 at a lateral side of the light guiding plate 124. The light source 126 of the present embodiment may be, for example, a plurality of point light sources. For instance, the light sources 126 may be composed by a plurality of light emitting diodes. In addition, in the present embodiment, a light bar extended towards a direction X may be formed by arranging linearly to the light source 126 on the printed circuit board (not illustrated). In the present embodiment, the light bar may be fixed to a lateral side of the light guiding plate 124 by using, for example, an embedding method, such that a linear light source emerged by the light bar may be transmitted from the lateral side of the light guiding plate 124 into the light guiding plate 124 to form a planar light source uniformly.

Figure 1E:
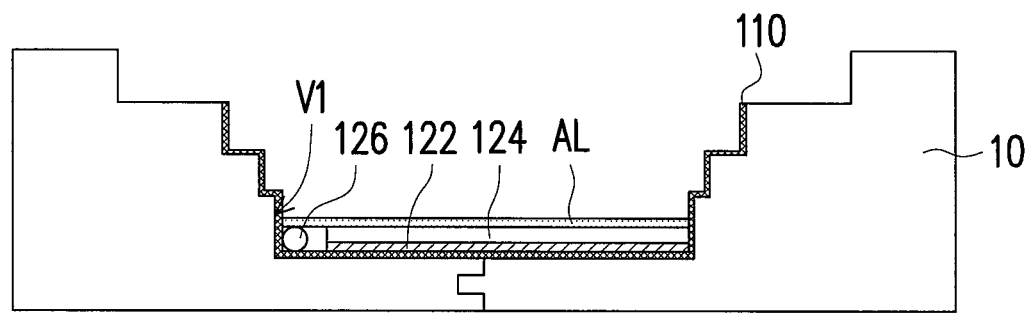

Referring to FIG. 1E, forming an uncured adhesive layer AL on the light source 126 and the light guiding plate 124. In the present embodiment, the adhesive layer AL may be formed around the light source 126 and the light guiding plate 124 (e.g., disposed along and around the first opening V1) or fully covered on the light source 126 and the light guiding plate 124 by using, for example, a coating method. However, the forming method and arranging position of the adhesive layer AL are not particularly limited in the invention. In addition, a material of the adhesive layer AL in the present embodiment may be, for example, a liquid optical clear resin or an optical clear adhesive (which may all be cured under UV light), but the invention is not limited thereto. In other embodiments, the material of the adhesive layer AL may also be other appropriate materials for fixing said members, or the adhesive layer AL may be cured by using other methods.

Figure 1F:
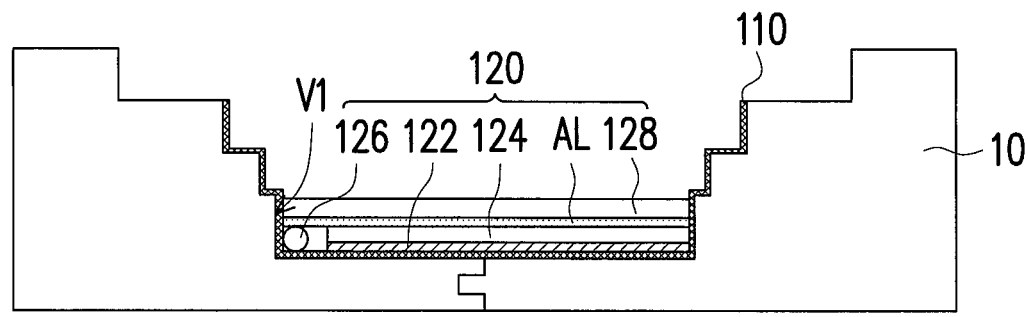

Referring to FIG. 1F, an optical film 128 is disposed on the adhesive layer AL, in which the optical film 128 is fixed on the light source 126 and the light guiding plate 124 through the adhesive layer AL. In the present embodiment, the optical film 128 may be a diffusion film, a brightness enhancement film, a prism film or any combination of the foregoing films, or other optical films capable of increasing light-emitting quality of the backlight module, increasing color rendering index of the backlight module, altering light-emitting angle of the backlight module or having other effects.

It should be noted that, although the optical film 128 in the present embodiment is only illustrated with a single layer, but the invention is not limited thereto. In other embodiments, the optical film 128 may also be a structure having multiple stacked layers, in which layers between the structure having multiple stacked layers may be fixed by disposing said adhesive layer AL. Once the optical film 128 is disposed, next, said adhesive layer AL may be cured by exposing to UV light, so as to complete the assembly process of the backlight module 120 of the present embodiment. In short, the backlight module 120 of the present embodiment is composed by the light guiding plate 124, the reflector 122, the light source 126, the adhesive layer AL and the optical film 128, in which the bore diameter $D_{V1}$ of the first opening V1 is substantially equal to or slightly greater than a size of the backlight module 120.

Figure 1G:
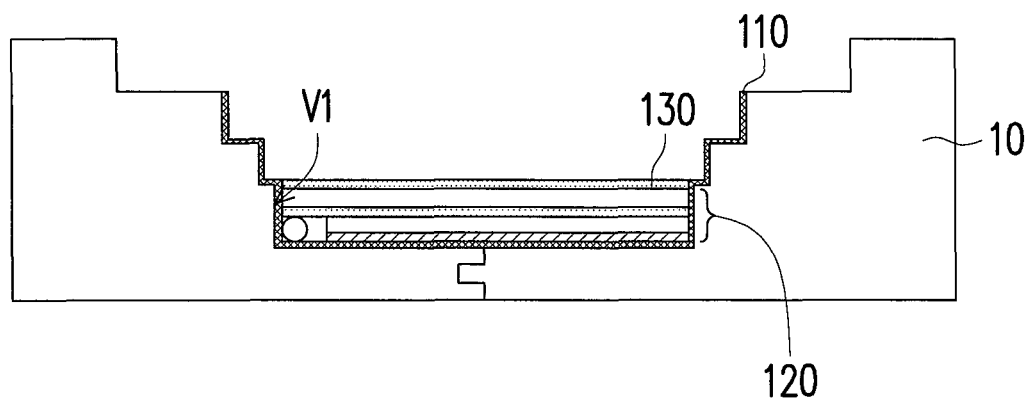

Referring to FIG. 1G, an uncured second adhesive layer 130 is formed on the backlight module 120. In the present embodiment, the second adhesive layer 130 may be formed around the backlight module 120 or fully covered on the backlight module 120 by, for example, a coating method. However, the forming method of the second adhesive layer 130 is not particularly limited in the invention. In addition, a material of the second adhesive layer 130 in the present embodiment may be, for example, a liquid optical clear resin or an optical clear adhesive (which may all be cured under UV light), but the invention is not limited thereto. In other embodiments, the material of the second adhesive layer 130 may also be other appropriate materials for fixing said members, or may be cured by using other methods.

Figure 1H:
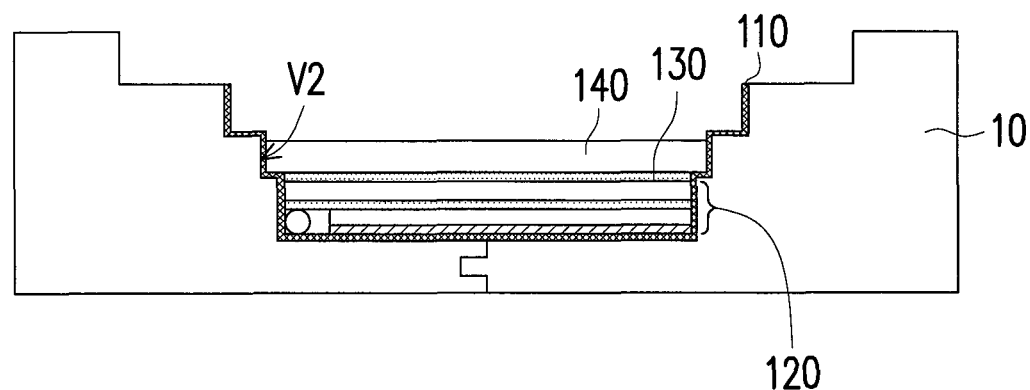

Referring to FIG. 1H, a display panel 140 is disposed in the second opening V2, in which the display panel 140 is fixed on the backlight module 120 through the second adhesive layer 130. Herein, a bore diameter $D_{V2}$ of the second opening V2 is substantially equal to or slightly greater than a size of the display panel 140. In addition, said second adhesive layer 130 is located between the backlight module 120 and the display panel 140, so as to fix the backlight module 120 and the display panel 140. More specifically, once the display panel 140 is disposed, said second adhesive layer 130 may be cured by exposing to UV light. As a result, the display panel 140 may be steadily attached onto the backlight module 120, so as to avoid problems such as misplacement or peeling off. In addition, the display panel 140 of the present embodiment may be liquid crystal display panels, organic electroluminescent display panels, plasma display panels, field emission display panels or other display panels.

After the bonding process of the backlight module 120 and the display panel 140 is completed, a light-on test may be performed to ensure that the backlight module 120 and display panel 140 may operate normally. Accordingly, if touch display functionalities alters in the subsequent tests, the possibility of such alteration caused by the backlight module 120 and display panel 140 may be eliminated. As a result, scope of the member which requires rework may be decreased, so that damages to the members by the rework process may also be reduce while retaining the integrity of other members which does not require the rework process.

Figure 1I:
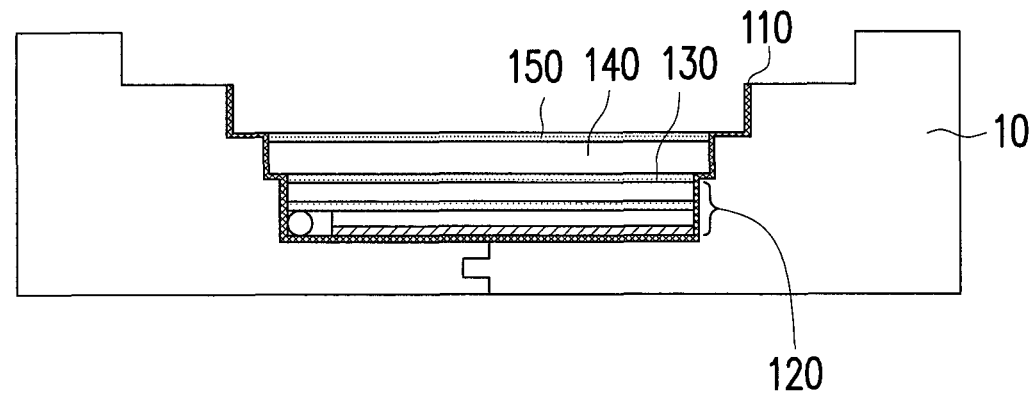

Referring to FIG. 1I, next, an uncured third adhesive layer 150 is formed on the display panel 140, in which the third adhesive layer 150 may be, for example, formed around the display panel 140 or covered on the display panel 140, and exposed outside of a IC boding (not illustrated) on the display panel 140. For instance, in the present embodiment, a protective film (not illustrated) may be applied onto the IC bonding of the display panel 140, so as to avoid the uncured third adhesive layer 150 from being attached onto the IC bonding. In addition, a forming method and a material of the third adhesive layer 150 are identical to the forming method and the material of the second adhesive layer 130, so that related description is omitted hereinafter.

Figure 1J:
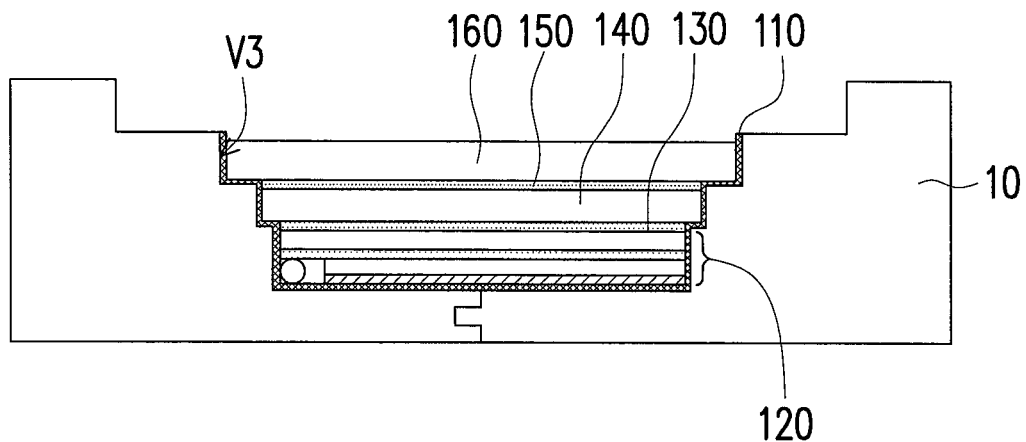

Referring to FIG. 1J, a touch panel 160 is disposed in the third opening V3, in which the touch panel 160 is fixed on the display panel 140 through the third adhesive layer 150. Herein, a bore diameter $D_{V3}$ of the second opening V3 is substantially equal to or slightly greater than a size of the touch panel 160. In addition, said third adhesive layer 150 is located between the touch panel 160 and the display panel 140, so as to fix the touch panel 160 and the display panel 140. More specifically, once the touch panel 160 is disposed, said third adhesive layer 150 may be cured by exposing to UV light. As a result, the touch panel 160 may be steadily attached on the display panel 140 to avoid problems such as misplacement or peeling off. Said protective film may be removed once the third adhesive layer 150 is cured.

In addition, the touch panel 160 may be embedded in the display panel 140 or onto on the display panel 140. In the embodiment which the touch panel 160 is embedded in the display panel 140, since the touch panel 160 and the display panel 140 are integrated together before the bonding process, the step of attaching the touch panel 160 may be omitted in said embodiment.

Figure 1K:
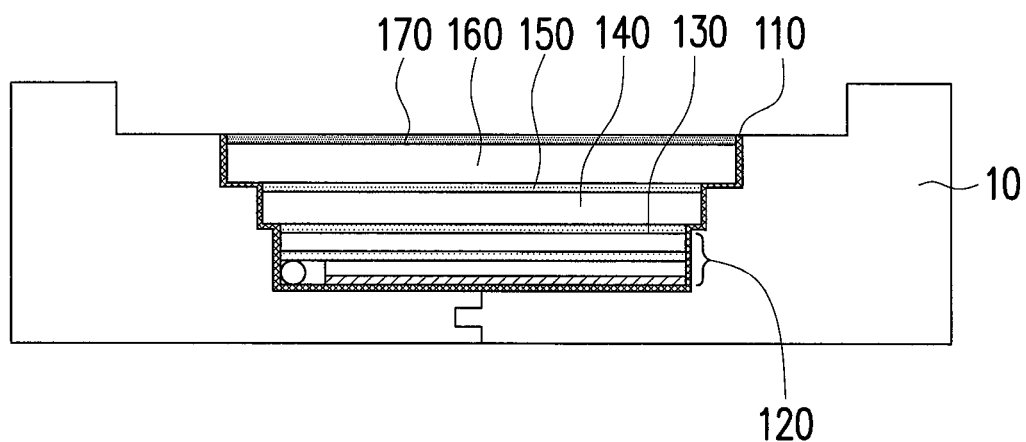

Referring to FIG. 1K, an uncured fourth adhesive layer 170 is formed on the touch panel 160. In the present embodiment, the fourth adhesive layer 170 may be formed around the touch panel 160 or fully covered on the touch panel 160 by using a coating method. However, the forming method of the fourth adhesive layer 170 is not particularly limited in the invention. In addition, a material of the fourth adhesive layer 170 in the present embodiment may be, for example, a pressure sensitive adhesive, a liquid optical clear resin or an optical clear adhesive (which may all be cured under UV light), but the invention is not limited thereto. In other embodiments, the material of the fourth adhesive layer 170 may also be other appropriate materials for fixing said members, or cured by using other methods.

Figure 1L:
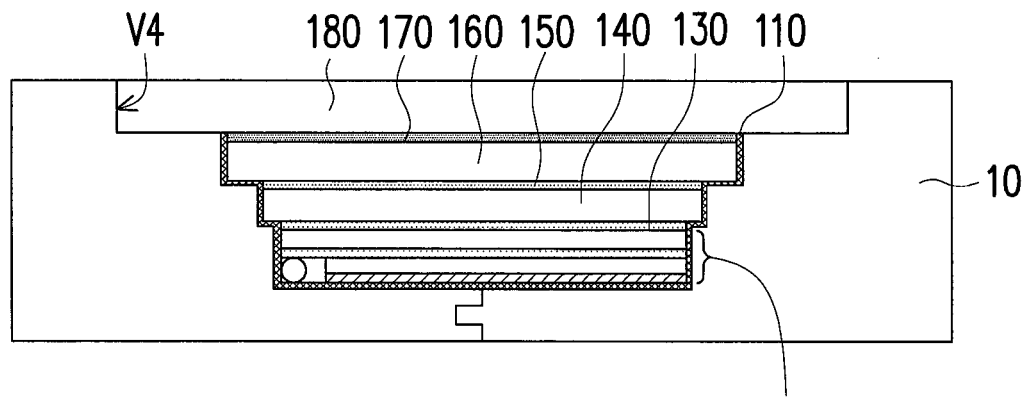

Referring to FIG. 1L, a cover plate 180 is disposed in the fourth opening V4, in which the cover plate 180 is fixed on the touch panel 160 through the fourth adhesive layer 170. Herein, a bore diameter $D_{V4}$ of the fourth opening V4 is substantially equal to or slightly greater than a size of the cover plate 180. In addition, said fourth adhesive layer 170 is located between the cover plate 180 and the touch panel 160, so as to fix the cover plate 180 and the touch panel 160. More specifically, once the cover plate 180 is disposed, the adhesive layers between the cover plate 180 and the touch panel 160, between the touch panel 160 and the display panel 140 and between the display panel 140 and the backlight module 120 may all be cured by exposing entirely to UV light. In the present embodiment, the cover plate 180 may be a transparent plastic substrate or a transparent tempered glass substrate, both may be used to enhance overall structural strength of the touch display module, so as further protect the touch display module from damage by external forces.

It should be noted that, the assembly process of the present embodiment may be completed by sequentially disposing the backlight module 120, the display panel 140, the touch panel 160 and the cover plate 180 by using opening design of the detachable module 10 and adhesive layers disposition. In comparison to the prior art, it is not required to have the alignment pattern manufactured on the display panel 140 and the touch panel 160 for positioning in the present embodiment, such that possibility of the alignment precision problem may be lower to further increase yield rate in assembling the touch display module.

Once the bonding process of the cover plate 180 and the touch panel 160 is completed, subsequent processes may be performed after completing tests such as ensuring signals form the display panel being normal and the touch panel 160 being operated normally.

Figure 1M:
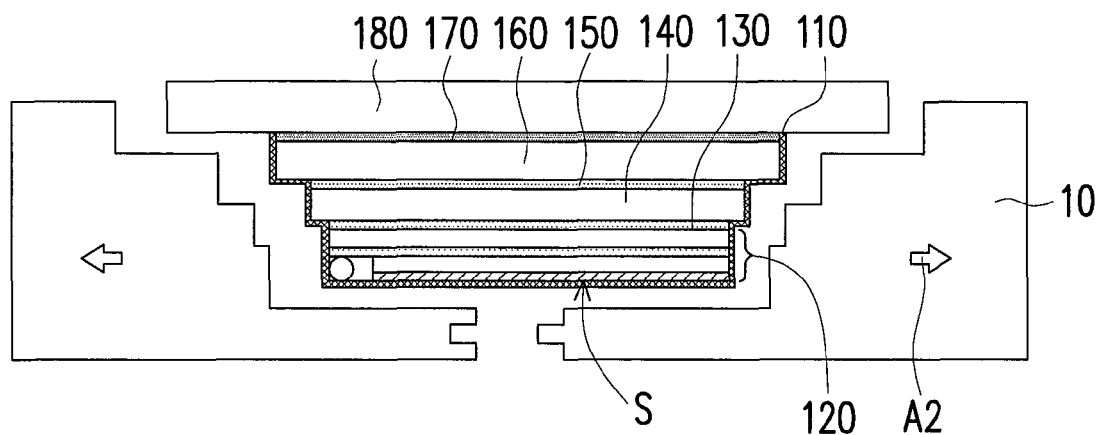

Referring to FIG. 1M, a mold release process (e.g., along a direction pointed by an arrow A2) may be performed, so that detachable mold 10 may be separated from the first adhesive layer 110 to form a touch display module 100. In the present embodiment, since the first adhesive layer 110 may have no adhesion to the detachable mold 10 made of metal, the detachable mold 10 may easily be separated from the first adhesive layer 110.

It should be noted that, after the mold release process, the first adhesive layer 110 of the present embodiment covers around the backlight module 120, the display panel 140 and the touch panel 160 and a back portion S of the backlight module 120. Therefore, besides being used for masking leaked light, the first adhesive layer 110 of the present embodiment may also served as a protective layer of the backlight module 120, the display panel 140 and the touch panel 160.

In addition, the detachable mold 10 is used as a structure for supporting and alignment in the assembly process of the backlight module 120, the display panel 140 and the touch panel 160. As a result, the front bezel, the back cover and the alignment pattern used in prior art may be omitted, such that the touch display module 100 may have advantages of being miniaturized and lightened comparing to the prior art. Moreover, since each member in the touch display module 100 is steadily disposed on the cover plate 180 (e.g., fixed by the first adhesive layer 110, the second adhesive layer 130, the third adhesive layer 150 and the fourth adhesive layer 170), overall structure of the touch display module 100 may be supported and fixed by the cover plate 180. After the mold release process, the touch display module 100 may be directly picked up from the cover plate 180 without having members (including the backlight module 120, the display panel 140 and the touch panel 160) being peeled therefrom. In other words, overall structure strength of the touch display module 100 may be increased by disposing adhesive layers between each member of the touch display module 100.

In addition, since each member in the present embodiment is bonded one after another, an independent test to the bonding status may be performed after each boning process. Therefore, damages caused by the rework process due to poor bonding found after completing the touch display module 100 of the present embodiment may be avoided.

Figure 2:
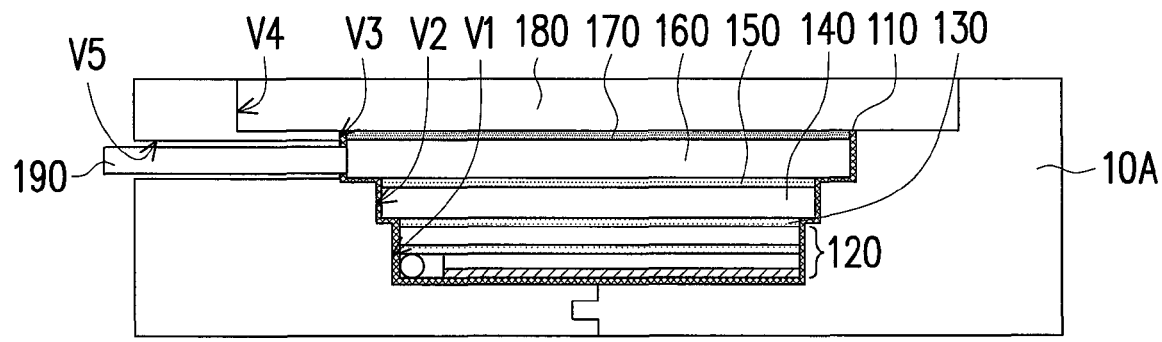
FIG. 2 is a schematic cross-sectional view illustrating a touch display module before a mold release process according to an embodiment of the invention.

It should be noted that, the above embodiments serve to illustrate rather than limit the scope of the invention. Another implementing aspect of the touch display module of the invention is illustrated below with reference to FIG. 2. FIG. 2 is a schematic cross-sectional view illustrating a touch display module before a mold release process according to an embodiment of the invention.

Referring to FIG. 2, a detachable mold 10A of the present embodiment and the detachable mold 10 illustrated in FIG. 1L have a similar structure, the differences therebetween lies where: The detachable mold 10A of the present embodiment further includes a fifth opening V5 which is connected to pass the third opening V3, and the fifth opening V5 is extended from the third opening V3 to outside of the detachable mold 10A. In addition, a touch display module 200 of the present embodiment and the touch display module 100 illustrated in FIG. 1M have similar members. But, the touch display module 200 of the present embodiment further includes a flexible printed circuit board 190, in which the flexible printed circuit board 190 is electrically and structurally connected to the touch panel 160. Accordingly, the touch display module 200 of the present embodiment may be electrically connected to an external line (not illustrated) by the flexible printed circuit 190, thereby effectively increasing the application scope of the touch display module 200.

More specifically, the touch display module 200 of the present embodiment and said touch display module 100 have similar manufacturing processes. But, the touch display module 200 of the present embodiment further disposes the flexible printed circuit board 190 in the fifth opening V5 to be electrically connected to the touch panel 160 after the touch panel 160 is disposed in the third opening V3 and before the fourth adhesive layer 170 is formed on the touch panel 160.

Since the fifth opening V5 is located at a lateral side of the detachable mold 10A and connected to pass the third opening V3, while forming the uncured fourth adhesive layer 170, the present embodiment may avoid the uncured fourth adhesive layer 170 to leak from the fifth opening V5 and attach on the flexible printed circuit board 190 by disposing a guard plate (not illustrated) and a protective film (not illustrated).

In addition, the touch display module 200 of the present embodiment may have the same advantages as the touch display module 100 in the previous embodiments, since the present embodiment has similar members and similar manufacturing processes to the previous embodiments. In short, the present embodiment may lower possibility of poor alignment to increase yield rate in assembling the touch display module 200 by assembling the backlight module 120, the display panel 140, the touch panel 160 and the cover plate 180 using the detachable mold 10A. Moreover, in the present embodiment, the first adhesive layer 110 may also be used as a protective layer of the backlight module 120, the display panel 140 and the touch panel 160 for masking leaked light. In addition, the present embodiment to have a relatively slimmer thickness and increase whole structure strength by disposing the first adhesive layer 110, the second adhesive layer 130, the third adhesive layer 150 and the fourth adhesive layer 170. The front bezel, the back cover and the alignment pattern used in prior art may also be omitted, so the touch display module 200 of the present embodiment may have a thickness which is relatively thinner.

In view of above, the assembly method of the invention may sequentially disposing the backlight module, the display panel, the touch panel and the cover plate using opening design of the detachable module and adhesive layers disposition. Therefore, in comparison to the prior art, the invention does not required to have the alignment pattern manufactured on the display panel and the touch panel for positioning, such that possibility of the alignment precision problem from happening may be reduce to further increase yield rate in assembling the touch display module. Also, member such as the front bezel, the back cover and the anti-splinted film used in prior art may also be omitted to effectively reduce overall thickness of the touch display module. In short, the touch display module of the invention may have a slimmer and lighter design while having a more preferable yield rate in assembling.

Although the invention has been described with reference to the above embodiments, it is apparent to one of the ordinary skill in the art that modifications to the described embodiments may be made without departing from the spirit of the invention. Accordingly, the scope of the invention will be defined by the attached claims not by the above detailed descriptions.

What is claimed is:

1. An assembly method of a touch display module, comprising following steps:
   providing a detachable mold, the detachable mold having a bottom portion and a first opening, a second opening, a third opening and a fourth opening connected to and allowing access to each other and exposed outside of the bottom portion in a stepped manner, wherein the first opening is adjacent to the bottom portion, the second opening is located between the first opening and the third opening and the third opening is located between the second opening and the fourth opening;
   forming a first adhesive layer on internal walls of the first opening, the second opening and the third opening and the bottom portion;
   disposing a backlight module in the first opening, wherein the backlight module is fixed on the bottom portion of the detachable mold through the first adhesive layer;
   forming a second adhesive layer on the backlight module;
   disposing a display panel in the second opening, wherein the display panel is fixed on the backlight module through the second adhesive layer;
   forming a third adhesive layer on the display panel;
   disposing a touch panel in the third opening, wherein the touch panel is fixed on the display panel through the third adhesive layer;
   forming a fourth adhesive layer on the touch panel;
   disposing a cover plate in the fourth opening, wherein the cover plate is fixed on the touch panel through the fourth adhesive layer; and
   performing a mold release process to form a touch display module by separating the detachable mold from the first adhesive layer, wherein the first adhesive layer covers around the backlight module, the display panel and the touch panel and a back portion of the backlight module.

2. The assembly method of the touch display module as claimed in claim 1, wherein a bore diameter of the fourth opening is greater than a bore diameter of the third opening, the bore diameter of the third opening is greater than a bore diameter of the second opening, the bore diameter of the second opening is greater than a bore diameter of the first opening, and the bore diameter of the first opening is equal to or slightly greater than a size of the backlight module, the bore diameter of the second opening is equal to or slightly greater than a size of the display panel, the bore diameter of the third opening is equal to or slightly greater than a size of the touch panel and the bore diameter of the fourth opening is equal to or slightly greater than a size of the cover plate.

3. The assembly method of the touch display module as claimed in claim 1, wherein a material of the first adhesive layer comprises a UV transfer black adhesive.

4. The assembly method of the touch display module as claimed in claim 1, wherein materials of the second adhesive layer and the third adhesive layer comprise a liquid optical clear resin (OCR) or an optical clear adhesive (OCA).

5. The assembly method of the touch display module as claimed in claim 1, wherein a material of the fourth adhesive layer comprises a pressure sensitive adhesive, a liquid optical clear resin or an optical clear adhesive.

6. The assembly method of the touch display module as claimed in claim 1, wherein the step of disposing the backlight module in the first opening comprises:
   disposing a reflector and a light guiding plate successively in the first opening, wherein the light guiding plate is stacked over the reflector, and the reflector is fixed on the bottom portion of the detachable mold through the first adhesive layer;
   disposing a light source at a lateral side of the light guiding plate;
   foaling an adhesive layer on the light source and the light guiding plate; and
   disposing an optical film on the adhesive layer, wherein the optical film is fixed on the light source and the light guiding plate through the adhesive layer.

7. The assembly method of the touch display module as claimed in claim 6, wherein the light source is composed by a plurality of light-emitting diodes.

8. The assembly method of the touch display module as claimed in claim 1, wherein the detachable module further comprises a fifth opening connected to pass through the third opening, the fifth opening is extended from one side of the third opening to outside of the detachable module, and a flexible printed circuit board is disposed in the fifth opening after disposing the touch panel in the third opening and before forming the fourth adhesive layer on the touch panel, the touch panel is electrically connected to the flexible printed circuit board.

9. A touch display module, comprising:
   a backlight module, comprises:
   a reflector;
   a light guiding plate stacked over the reflector;
   a light source disposed at a lateral side of the light guiding plate;
   an optical film disposed above the light source and the light guide plating; and
   an adhesive layer disposed on the light source and the light guiding plate, wherein the optical film is fixed above the light source and the light guiding plate through the adhesive layer;
   a cover plate disposed opposite to the backlight module;
   a display panel disposed between the backlight module and the cover plate;
   a touch panel disposed between the display panel and the cover plate;
   a first adhesive layer covered around the backlight module, the display panel and the touch panel and a back portion of the backlight module;
   a second adhesive layer disposed between the backlight module and the display panel, wherein the display panel is fixed on the backlight module through the second adhesive layer;
   a third adhesive layer disposed between the display panel and the touch panel, wherein the touch panel is fixed on the display panel through the third adhesive layer; and
   a fourth adhesive layer disposed between the touch panel and the cover plate, wherein the cover plate is fixed on the touch panel through the fourth adhesive layer.

10. The touch display module as claimed in claim 9, wherein a material of the first adhesive layer comprises a UV transfer black adhesive.

11. The touch display module as claimed in claim 9, wherein materials of the second adhesive layer and the third adhesive layer comprise a liquid optical clear resin or an optical clear adhesive.

12. The touch display module as claimed in claim 9, wherein a material of the fourth adhesive layer comprises a pressure sensitive adhesive, a liquid optical clear resin or an optical clear adhesive.

13. The touch display module as claimed in claim 9, wherein the light source is composed by a plurality of light-emitting diodes.

14. The touch display module as claimed in claim 9, further comprising:
   a flexible printed circuit board disposed at one side of the touch panel and electrically connected to the touch panel.

* * * * *